United States Patent
Kim et al.

(10) Patent No.: US 11,873,905 B2
(45) Date of Patent: Jan. 16, 2024

(54) STOP SEAL FOR APPLICATION OF HIGH TEMPERATURE AND HIGH PRESSURE

(71) Applicant: FLOWSERVE KSM CO., LTD., Gimpo-si (KR)

(72) Inventors: Yun Ho Kim, Seoul (KR); Joo Hwan Kim, Seoul (KR)

(73) Assignee: FLOWSERVE KSM CO., LTD., Gimpo-si (KR)

( * ) Notice: Subject to any disclaimer, the term of this patent is extended or adjusted under 35 U.S.C. 154(b) by 0 days.

(21) Appl. No.: 17/783,150

(22) PCT Filed: Dec. 31, 2019

(86) PCT No.: PCT/KR2019/018773
§ 371 (c)(1),
(2) Date: Jun. 7, 2022

(87) PCT Pub. No.: WO2021/137315
PCT Pub. Date: Jul. 8, 2021

(65) Prior Publication Data
US 2023/0014978 A1    Jan. 19, 2023

(51) Int. Cl.
*F16J 15/3284* (2016.01)
*F16J 15/54* (2006.01)
*F04D 29/12* (2006.01)

(52) U.S. Cl.
CPC .............. *F16J 15/54* (2013.01); *F04D 29/12* (2013.01)

(58) Field of Classification Search
CPC .......... F16J 15/54; F16J 15/32; F16J 15/3204; F16J 15/3208; F16J 15/3224; F16J 15/3284; F04D 29/12
See application file for complete search history.

(56) References Cited

U.S. PATENT DOCUMENTS

| | | |
|---|---|---|
| 5,171,024 A | 12/1992 | Janocko |
| 2002/0074742 A1 | 6/2002 | Quoiani |
| 2006/0163818 A1* | 7/2006 | Breen .................. F16J 15/3212 277/553 |
| 2010/0239413 A1 | 9/2010 | Tesh et al. |
| 2014/0027984 A1 | 1/2014 | Saucerman et al. |

(Continued)

FOREIGN PATENT DOCUMENTS

| | | | | |
|---|---|---|---|---|
| CN | 113623399 A | * | 11/2021 | |
| DE | 10112397 A1 | * | 10/2002 | ........... F16J 15/3212 |

(Continued)

OTHER PUBLICATIONS

International Search Report for PCT/KR2019/018773, dated Sep. 17, 2020.

*Primary Examiner* — Gilbert Y Lee
(74) *Attorney, Agent, or Firm* — Sughrue Mion, PLLC (57) ABSTRACT

A stop seal for application of high temperature and high pressure is disclosed. A stop seal contains a first seal member and a second seal member, wherein the stop seal can prevent a fluid of high temperature and high pressure from leaking into an atmospheric space because, when the fluid of high temperature is introduced and the first seal member is moved toward a direction adjacent to a pump shaft, an opposite side of the second seal member is moved from a first position to a second position by the first seal member so as to block a gap between a pump side and a housing.

8 Claims, 7 Drawing Sheets

(56) References Cited

U.S. PATENT DOCUMENTS

2014/0161589 A1    6/2014  Janocko et al.
2017/0314683 A1 * 11/2017  Nolte ..................... F16J 15/164

FOREIGN PATENT DOCUMENTS

| DE | 10306728 A1 * | 9/2004 | ........... F16J 15/3284 |
|----|---------------|--------|--------------------------|
| DE | 10 2015 000 805 B3 | 1/2016 | |
| EP | 0343409 A2 * | 11/1989 | |
| GB | 2577908 A * | 4/2020 | ............ F02F 11/007 |
| JP | 4-101864 U | 9/1992 | |
| JP | 8-68387 A | 3/1996 | |
| JP | 2003-262276 A | 9/2003 | |
| JP | 2013-181528 A | 9/2013 | |
| JP | 2013-209974 A | 10/2013 | |
| JP | 2018-123953 A | 8/2018 | |
| KR | 10-2013-0079250 A | 7/2013 | |
| KR | 10-2014-0146581 A | 12/2014 | |
| KR | 10-2020-0003672 A | 1/2020 | |

* cited by examiner

STOP SEAL FOR APPLICATION OF HIGH TEMPERATURE AND HIGH PRESSURE

CROSS REFERENCE TO RELATED APPLICATIONS

This application is a National Stage of International Application No. PCT/KR2019/018773 filed Dec. 31, 2019.

TECHNICAL FIELD

The present invention relates to a stop seal for application of high temperature and high pressure, and more specifically, to a stop seal for application of high temperature and high pressure capable of preventing the fluid of high temperature and high pressure from leaking into an atmospheric space even if the function of a mechanical sealing device is lost.

BACKGROUND ART

As well known, a nuclear reactor coolant pump may be provided between a steam generator and a nuclear reactor of a primary system of a nuclear power plant. The nuclear reactor coolant pump is a core device of a nuclear steam supply system (NSSS) that sucks a cooling water or coolant (hereinafter referred to as 'coolant') heat-exchanged in the steam generator and discharges the coolant to the nuclear reactor.

Such a nuclear reactor coolant pump may be configured as a so-called vertical pump having a pump shaft disposed vertically to suck the coolant from the lower portion and discharge the coolant to one side.

Figure 1:
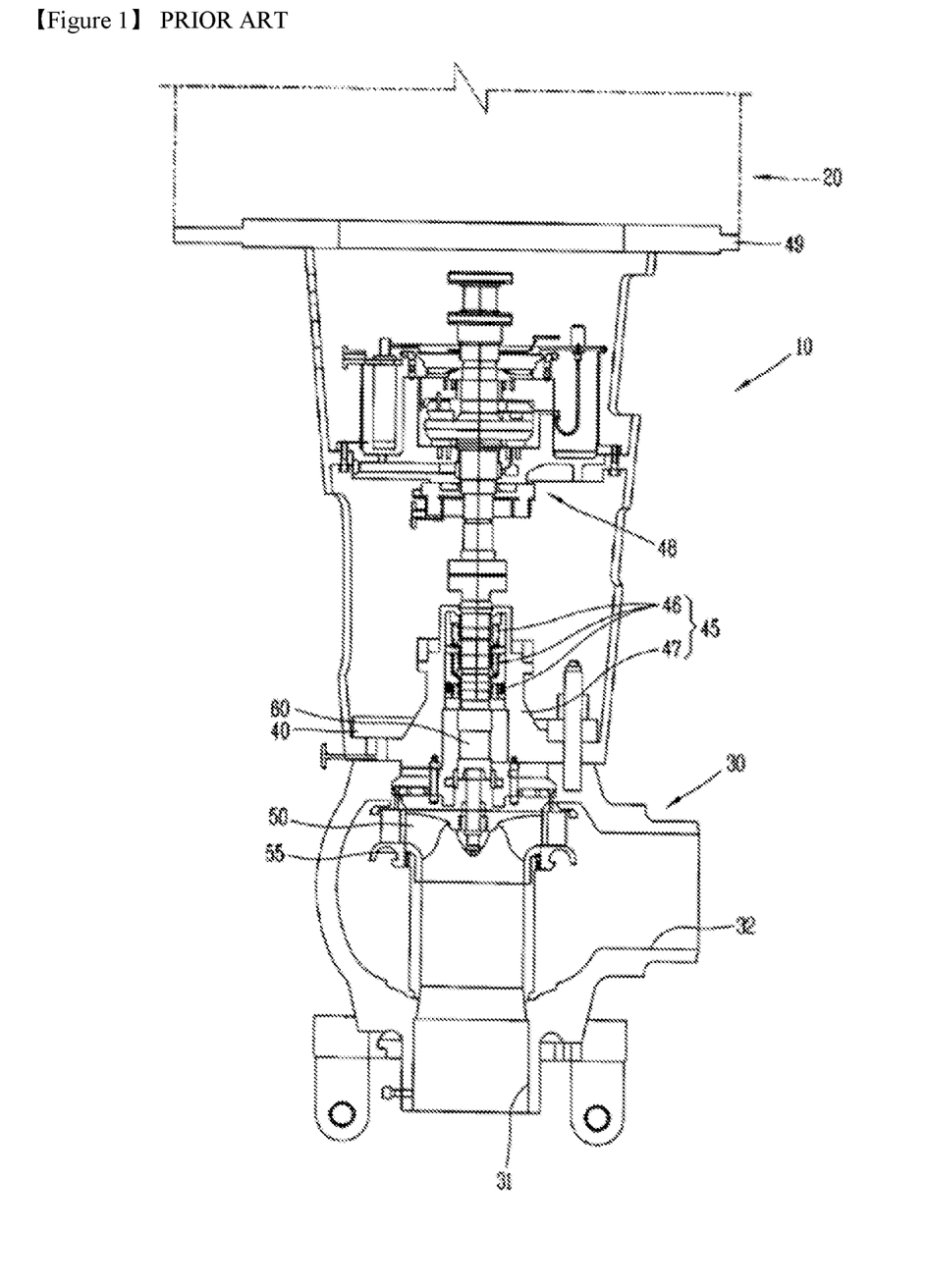
FIG. 1 is a diagram illustrating a pump according to the related art.

FIG. 1 is a view illustrating an example of a conventional nuclear reactor coolant pump.

As illustrated in FIG. 1, the nuclear reactor coolant pump may include a pumping unit 10 for sucking and discharging the coolant, and a driving unit 20 providing a driving force to the pumping unit 10.

The pumping unit 10 and the driving unit 20 may be disposed along a vertical direction. The driving unit 20 may be installed to extend upwardly on the upper end of the pumping unit 10 to be supported by the pumping unit 10. The driving unit 20 is typically configured to include an electric motor, and the electric motor may have a pump shaft disposed in a vertical direction.

The pumping unit 10 may include a housing 30 having a movement path of the coolant formed therein, an impeller 50 rotatably disposed inside the housing 30, and a pump shaft 60 having one end connected to the impeller 50 and the other end extending upward.

A suction unit 31 may be formed at a lower portion of the housing 30 to suck the coolant. A discharge unit 32 through which the coolant sucked through the suction unit 31 is discharged may be provided on one side of the housing 30. An impeller 50 may be rotatably provided in an inner upper region of the housing 30. The impeller 50 may be rotatably coupled to the pump shaft 60 disposed vertically. A diffuser or guide vane 55 (hereinafter referred to as the 'guide vane 55') for converting the velocity energy of the coolant into pressure energy may be provided on one side of the impeller 50.

The housing 30 may have a spherical shape so that a decrease in the speed and pressure of the coolant passing through the guide vane 55 may be suppressed. A cover 40 may be provided on the upper side of the housing 30. A sealing unit 45 may be provided on the upper portion of the cover 40 to suppress the leakage of the coolant.

The sealing unit 45 may be configured to include, for example, 3 stage mechanical seals 46 formed along an axial direction around the pump shaft 60. The sealing unit 45 may include a seal housing 47 surrounding the 3 stage mechanical seals 46. A so-called thrust bearing assembly 48 for rotatably supporting the pump shaft 60 in the axial direction may be provided on the upper side of the sealing unit 45 along the axial direction. A support unit 49 for supporting the driving unit 20 may be provided on an upper side of the thrust bearing assembly 48.

The coolant pump of the related art has a problem in that, when the mechanical sealing unit 45 loses its function, the coolant of high temperature and high pressure immediately leaks into the atmospheric space. As such, the coolant leaks into the atmospheric space to cause great damage to the surrounding environment.

Meanwhile, in U.S. Pat. No. 5,171,024, there is disclosed a cooling pump seal device including a housing 32 capable of separating a fluid leakage introduction space introduced when the fluid leaks from the outside, and a stop seal 72 having at least one portion disposed in the fluid leakage introduction space and the other portion installed between the pump shafts 34 disposed through the housing 32.

Figure 2:
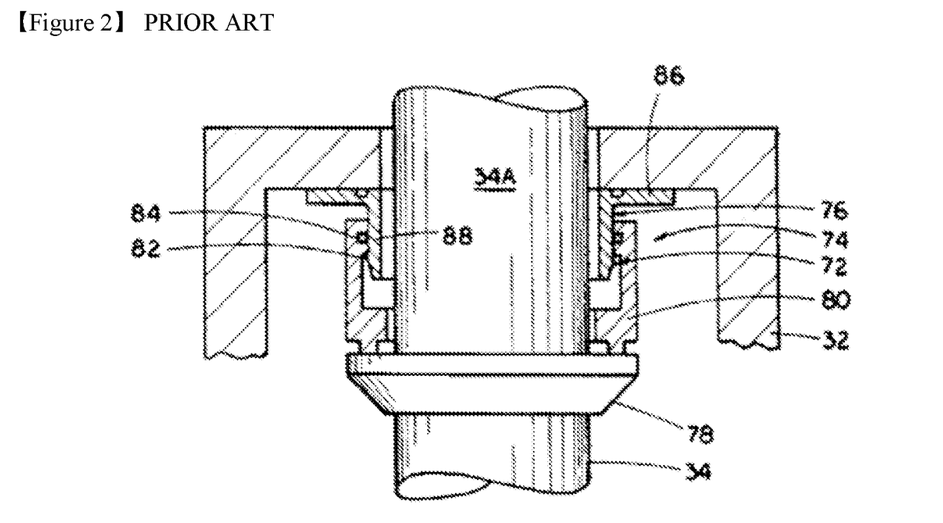
FIG. 2 is a diagram illustrating a stop seal used in the pump according to the related art.

At this time, as illustrated in FIG. 2, the stop seal 72 is disposed at the fluid introduction space side and surrounds the circumference of the pump shaft 34 in a ring shape, and has an outer circumferential surface supported by the housing and an inner circumferential surface spaced apart from the outer surface of the pump shaft at a predetermined interval, and the material of the stop seal is composed of a shape memory alloy that operates at a high temperature.

Figure 3:
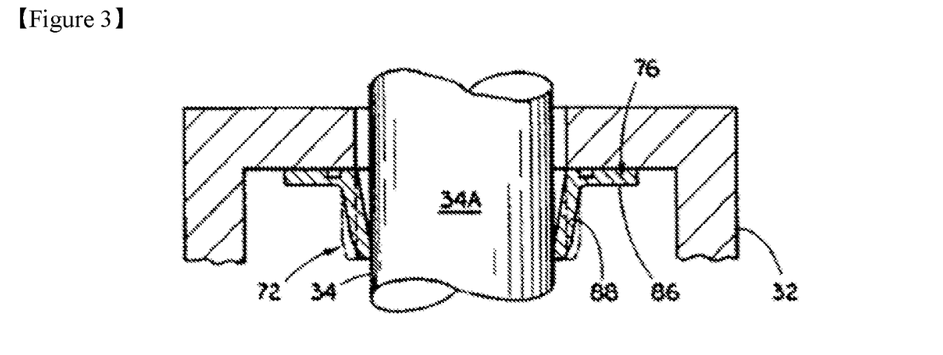
FIG. 3 is a diagram illustrating an operation state of FIG. 2.

In a high temperature state, the stop seal is deformed and configured to seal the fluid leakage space and the outside as illustrated in FIG. 3.

In the related art, when the fluid of high temperature is introduced to the inside, the stop seal 72 made of a metal material composed of the shape memory alloy comes into direct contact with the pump shaft 34, and as such, when the metal material comes into direct contact with the pump shaft, the vibration of the pump shaft 34 is induced, thereby causing a situation in which the entire nuclear power plant needs to be stopped.

In particular, in an abnormal situation of nuclear power generation, only high-temperature air, not high-temperature water, is introduced, and in some cases, such a situation where only high-temperature air is introduced is also a situation before an emergency. After the high-temperature air is introduced, the high-temperature air may return to a normal state again, and after the high-temperature air is introduced, high-temperature water may also be introduced, and there may be a situation in which the entire nuclear power plant needs to be stopped.

However, in the related art, even in a situation where only the high-temperature air is introduced, the stop seal 72 made of a metal material comes into contact with the pump shaft to induce the pump vibration of the pump shaft and the nuclear power plant needs to be stopped, and as a result, there are cases in which a very large loss is caused in the operation of nuclear power.

DISCLOSURE

Technical Problem

The present invention has been made to solve the aforementioned problems, and more particularly, an object of the present invention is to provide a stop seal for application of high temperature and high pressure to prevent a fluid from leaking into an atmospheric space even if the function of a mechanical sealing unit is lost.

Technical Solution

According to an aspect of the present invention, there is provided a stop seal for application of high temperature and high pressure used as a secondary sealing means to prevent a fluid of high temperature and high pressure from leaking into an atmospheric space when a function of a primary sealing means provided in a nuclear reactor coolant pump is lost.

The stop seal may be installed between a column-shaped pump shaft and a housing surrounding the pump shaft and spaced apart from the pump shaft at a predetermined interval to have a gap between the pump shaft and the housing, as an assembly of operating on the fluid of high temperature and high pressure, may include a first seal member which is made of a shape memory alloy material, and is deformed when the fluid of high temperature is introduced to be moved in a direction adjacent to the pump shaft, and a second seal member which has one side fixed to the housing and an opposite side which is movable between a first position spaced apart from the pump shaft and a second position in contact with the pump shaft to seal the gap, and is made of a synthetic resin material, wherein when the fluid of high temperature and high pressure is introduced and the first seal member is moved in the direction adjacent to the pump shaft, the opposite side of the second seal member may be moved from the first position to the second position by the first seal member to block the gap between the pump shaft and the housing, thereby preventing the fluid of high temperature and high pressure from leaking into the atmospheric space.

In the stop seal, the second seal member may be made of a softer material than the pump shaft.

In the stop seal, the other end of the second seal member may be disposed between the pump shaft and the first seal member and the other end of the second seal member may come into contact with the pump shaft when the first seal member is moved close to the pump shaft.

In the stop seal, the second seal member may have a first fixing part of which one end is fixed to the housing and a first extension part extending from the first fixing part toward the pump shaft, wherein the first seal member may be in contact with an opposite surface to the surface facing the pump shaft in the first extension part.

In the stop seal, a locking protrusion may be provided on the end of the first extension part to be curved in a direction far away from the pump shaft to prevent the first seal member from being separated.

The stop seal may further include a third seal member made of a metal material which has one side fixed to the housing and an opposite side which is moved between a third position spaced apart from the pump shaft and a fourth position coming into contact with the pump shaft to block the gap, and is moved from the third position to the fourth position by the second seal member elastically deformed by a differential pressure to seal the gap when the differential pressure is generated before and after the second seal member after the second seal member blocks the gap.

In the stop seal, the second seal member may be provided between the first seal member and the third seal member.

In the stop seal, the third seal member may have a second fixing part of which one end is fixed to the housing and a second extension part extending from the second fixing part toward the pump shaft, wherein an opposite surface to the surface facing the pump shaft in the second extension part may face the second seal member.

In the stop seal, the third seal member may be made of a harder material than the second seal member.

Advantageous Effects

According to the present invention, the stop seal for application of high temperature and high pressure has an advantage of preventing a large loss of the fluid by contacting the stop seal with the pump shaft to have airtightness even if the function of the first sealing means is lost to prevent the fluid of high temperature and high pressure from leaking into the atmospheric space.

According to the present invention, the stop seal for application of high temperature and high pressure has an advantage of preventing the vibration of the pump shaft from being induced by contacting the second seal member made of a soft plastic material with the pump shaft instead of deforming the shape memory alloy to be in direct contact with the pump shaft when the high-temperature air is introduced.

BEST MODE

Hereinafter, a stop seal for application of high temperature and high pressure according to an embodiment of the present invention will be described in detail with reference to the accompanying drawings.

A stop seal 130 according to the present invention is disposed between a housing 110 and a pump shaft 120 of a pump 100.

The housing 110 may separate a fluid introduction space 200, which is introduced when the fluid leaks, from the outside (atmospheric space; a right part of the housing in FIG. 4), and is disposed around the pump shaft 120 to approximately surround the pump shaft 120 and has a ring shape to surround the pump shaft 120.

Figure 4:
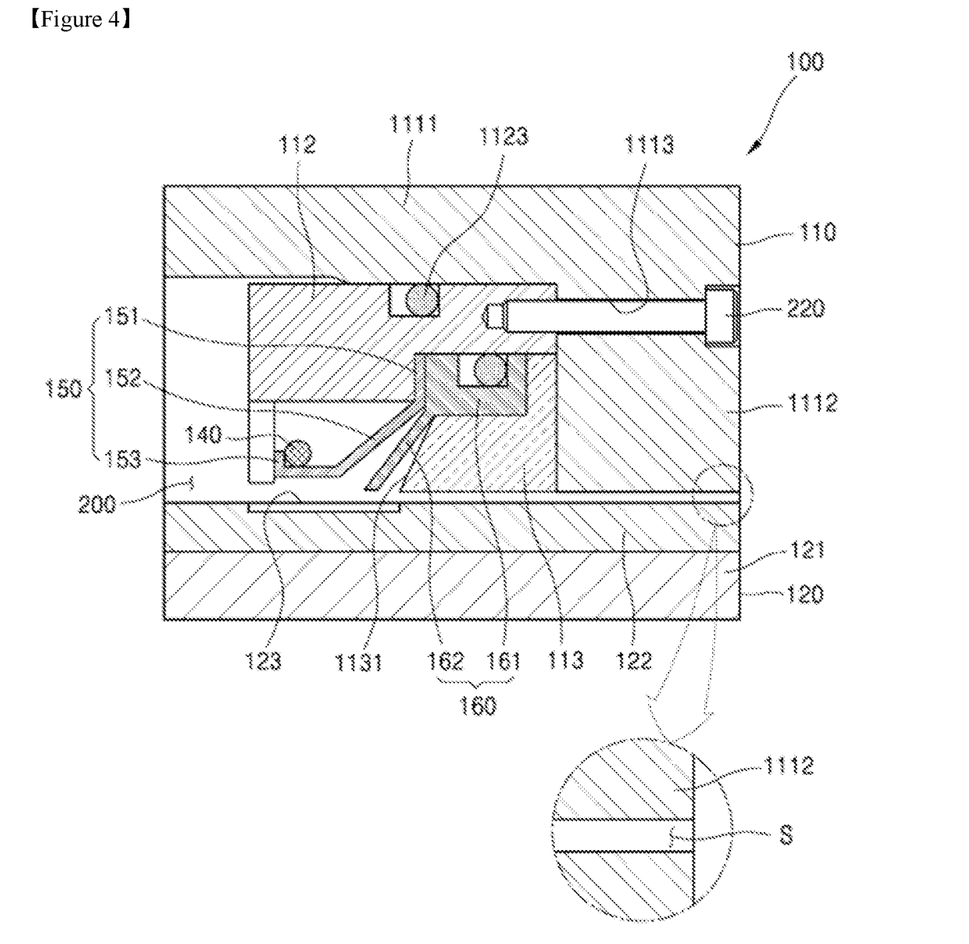
FIG. 4 is a diagram illustrating a part of a stop seal according to an embodiment of the present invention.

The housing 110 is configured to include a body part 111, a first support part 112, and a second support part 113.

The body part 111 is configured by a first ring-shaped portion 1111 which has a predetermined inner diameter, surrounds the pump shaft 120 and has a fluid introduction space 200 therein, and a second ring-shaped portion 1112 which has a smaller inner diameter than the first portion 1111 and is spaced apart from the pump shaft 120 at a predetermined distance to have a gap S from the pump shaft 120. The body part 111 has an approximately "¬" cross-sectional shape when cut in a direction perpendicular to a longitudinal direction of the pump shaft 120.

The second portion 1112 is provided with a bolt hole 1113 penetrating from one side toward the fluid introduction space 200, and configured with a bolt 220 to be inserted through the bolt hole 1113.

The first support part 112 is a configuration which is inserted into the body part 111 and cooperates with the second support part 113 to fix the positions of a second seal member 150 and a third seal member 160. Specifically, the first support part 112 has a ring shape that is inserted into the inner circumferential surface of the first portion 1111 of the body part 111 and is configured to be fixed by a bolt 220 protruding through the bolt hole 1113 of the second portion 1112. An O-ring 1123 is formed on a contact surface between the first support part 112 and the first portion 1111 of the body part 111 to have airtightness.

The second support part 113 is configured to cooperate with the first support part 112 to have an accommodating space in the form of a rectangular cross section therebetween. Such a second support part 113 has a support surface 1131 that is further away from the second portion 1112 as being adjacent to the pump shaft 120, and the third seal member 160 is restrained by the support surface 1131 so as not to be deformed over a certain level. That is, the support surface 1131 performs a function of supporting the third seal member 160 so as not to be further deformed after the third seal member 160 spaced apart from the pump shaft 120 comes into contact with the surface of the pump shaft 120.

The second support part 113 is fixed in contact with the second portion 1112 of the body part 111.

At least a part of the pump shaft 120 is disposed in the fluid introduction space 200, and the remaining part is disposed at the outside of the housing 110 by passing through the housing 110. The pump shaft 120 is coupled to the impeller to rotate together with the impeller, and has a substantially columnar shape.

The pump shaft 120 is preferably made of a metal material, and it is preferable to use a metal material having excellent durability so as to rotate at a high speed together with the impeller.

Such a pump shaft 120 includes a shaft body 121 made of a metal material, and a sleeve 122 fitted to the outer surface of the shaft body 121. At this time, a sleeve coating layer 123 having high hardness and a low coefficient of friction is formed on the outer surface of the sleeve portion with which the second seal member 150 or the third seal member 160 is in contact. When the second seal member is in contact with the sleeve coating layer, frictional force is not generated and rotation of the pump shaft is not prevented.

The stop seal 130 is a configuration which is installed between the column-shaped pump shaft 120 and the housing 110 surrounding the pump shaft 120 to seal a gap between the pump shaft 120 and the housing 110. Specifically, when high-temperature air is introduced or high-temperature or high-pressure water is introduced into the fluid introduction space 200, the stop seal 130 is used to prevent the fluid from leaking into the atmospheric space.

The stop seal 130 includes the first seal member 140, the second seal member 150, and the third seal member 160.

The first seal member 140 is made of a shape memory alloy material, and is contracted and deformed when the fluid of high temperature and high pressure is introduced to be moved in a direction adjacent to the pump shaft 120. The first seal member 140 is formed in a ring shape having a circular cross section, and is contracted when a fluid of high temperature comes into contact with the first seal member 140 while seated on the second seal member 140, so that the second seal member 150 seals the gap S.

Specifically, the first seal member 140 uses a property of cooling an alloy memorizing a certain shape to be made into martensite, and then changing the shape and heating to be made into austenite, and restoring the shape into an original shape. When coming into contact with the fluid of high temperature, the first seal member 140 is sufficiently spaced apart from the pump shaft 120 and after coming into contact with the fluid of high temperature, the first seal member 140 is contracted and deformed to be moved adjacent to the pump shaft 120.

In the second seal member 150, one side is fixed to the housing 110, an opposite side is disposed in a first position (position in FIG. 4) spaced apart from the pump shaft 120 and then elastically deformed when an external force is applied to the first seal member 140 by the deformation to come into contact with the pump shaft 120 and then is moved to a second position (position of FIG. 5) sealing the gap. Such a second seal member 150 is made of a synthetic resin material, specifically an engineering plastic material softer than the pump shaft 120 to be configured to perform only the sealing without causing the vibration in the rotating pump shaft 120 even when coming into contact with the pump shaft 120.

Figure 5:
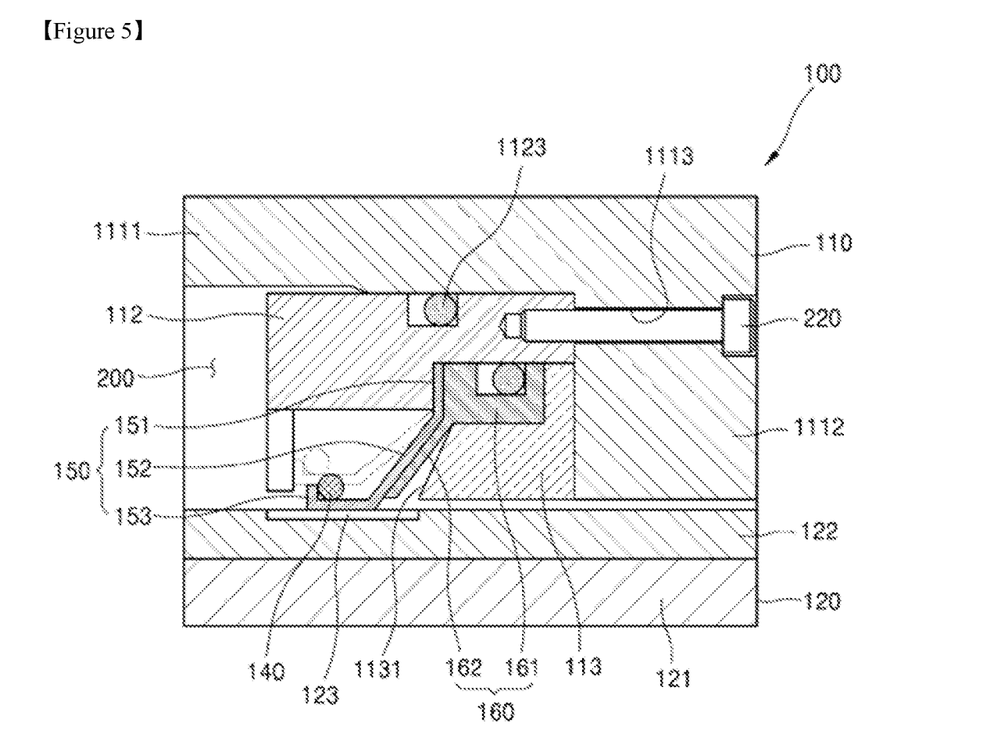
FIGS. 5 and 6 are diagrams illustrating an operation state of the stop seal of FIG. 4.

Such a second seal member 150 performs a function of preventing the fluid of high temperature and high pressure from leaking into the atmospheric space by blocking the gap S between the pump shaft 120 and the housing 110 while the opposite side of the second seal member 150 is moved from the first position to the second position by the first seal member 140 when the fluid of high temperature and high pressure is introduced to be moved in the direction in which the first seal member 140 is adjacent to the pump shaft 120.

The second seal member 150 may include a first fixing part 151 of which one end is fixed to the housing 110, and a first extension part 152 extending from the first fixing part 151 toward the pump shaft 120, and a locking protrusion 153 is provided on the end of the first extension part 152 to prevent the first seal member 140 from being separated.

The first fixing part 151 is a part fixed to the housing 110, and is inserted into the housing 110 to be fixed in position.

The first extension part 152 is a part extending from the first fixing part 151 toward the pump shaft 120, and is usually present in the first position to open the gap between the housing 110 and the pump shaft 120, and then serves to seal the gap S by coming into contact with the outer surface of the pump shaft 120 while being moved toward the central axis of the pump shaft 120 when the first seal member 140 is contracted and deformed.

Specifically, the first extension part 152 is disposed between the pump shaft 120 and the second seal member 140, and is configured to be in contact with the pump shaft 120 when the first seal member 140 is moved in a direction adjacent to the pump shaft 120. The first seal member 140 is seated on an opposite surface to the surface facing the pump shaft 120 in the first extension part 152.

The locking protrusion 153 is provided at the end of the first extension part 152, and is curved in a direction far away from the pump shaft 120 to prevent the first seal member 140 from being separated in the process in which the first seal member 140 seated on the second seal member 150 is contracted and deformed. While the first seal member 140 seated on the second seal member 150 is contracted and deformed, the first seal member 140 is locked to the locking protrusion 153 to be prevented from being separated in a left-right direction so that the second seal member 150 may be in contact with the outer surface of the pump shaft 120 to seal the gap.

The third seal member 160 has one side fixed to the housing 110 and an opposite side which is moved between a third position (position of FIGS. 4 and 5) spaced apart from the pump shaft 120 and a fourth position (position of FIG. 6) coming into contact with the pump shaft 120 to block the gap. When an external force is applied by the second seal member 150, the third seal member 160 existing in the third position is deformed and moved to the fourth position. When a differential pressure is generated before and after the second seal member 150 after the second seal member 150 blocks the gap S, the third seal member 160 is moved from the third position to the fourth position by the second seal member 150 elastically deformed by the differential pressure to seal the gap. Such a third seal member 160 is made of a metal material.

Such a third seal member 160 may include a second fixing part 161 of which one end is fixed to the housing 110, and a second extension part 162 extending from the second fixing part 161 toward the pump shaft 120, and in the second extension part 162, an opposite surface to the surface facing the pump shaft 120 is disposed to face the second seal member 150.

Figure 6:
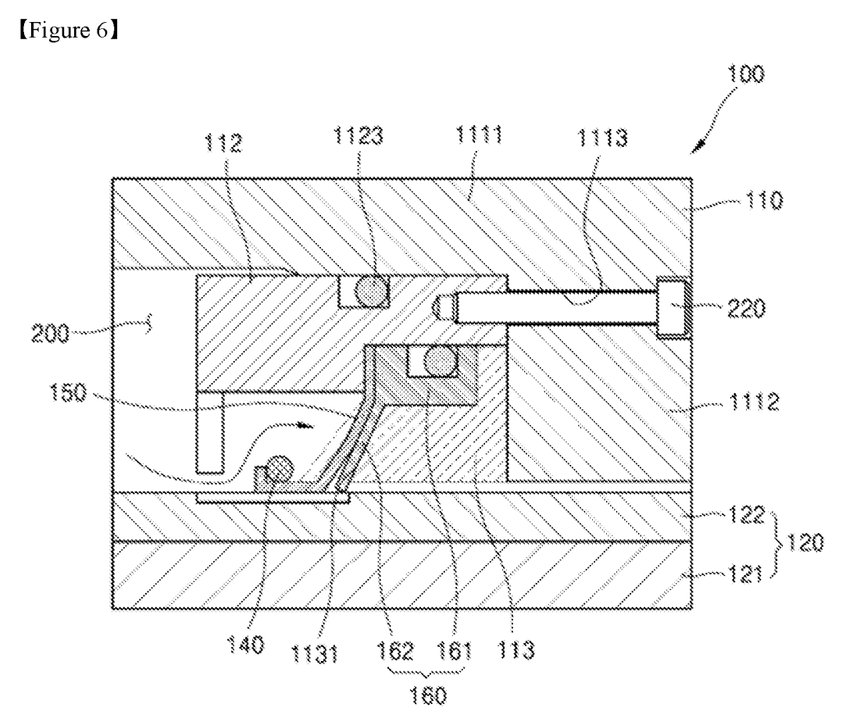

The second seal member 150 is in contact with the outer surface of the pump shaft 120 by the first seal member 140 to perform a primary sealing operation, and in this state, the third seal member 160 is maintained to be spaced apart from the pump shaft 120. Thereafter, when high-temperature water or an additional fluid of high temperature and high pressure is introduced and a differential pressure is generated between the fluid introduction space 200 and the atmospheric space, the second seal member 150 is additionally deformed by the pressure to elastically deform the third seal member 160. In this process, the third seal member 160 is in contact with the outer surface of the pump shaft 120 to perform a secondary sealing operation, thereby enabling tight sealing.

Such a third seal member 160 is made of a harder material than the second seal member 150 and made of a metal material to reliably perform the sealing function even when the high-temperature water is introduced.

The operation and effect of the stop seal 130 according to an embodiment of the present invention will be described as follows.

First, when the fluid of high temperature is introduced through the fluid introduction space 200, the first seal member 140 is contracted and deformed in the center direction of the pump shaft 120, and while the second seal member 150 made of an engineering plastic material is in contact with the outer diameter of the pump shaft 120 by contracting and deforming the first seal member 140, as illustrated in FIG. 5, the second seal member 150 performs the initial sealing operation. In this state, since the second seal member 150 made of a soft plastic material is in contact with the pump shaft 120, the second seal member 150 performs only the sealing function without interfering with the rotation of the pump shaft 120 to prevent high-temperature air from leaking into the atmospheric space.

Meanwhile, when the fluid of high temperature and high pressure is continuously introduced or water of high temperature and high pressure is continuously introduced, a differential pressure is generated between the fluid introduction space 200 and the atmospheric space. By the differential pressure generated at this time, the second seal member 150 is elastically deformed toward the third seal member 160 as illustrated in FIG. 6 while maintaining the sealing. Accordingly, as the third seal member 160 is elastically deformed toward the pump shaft 120, the end of the third seal member 160 comes into contact with the outer surface of the pump shaft 120 to perform more firmly the secondary sealing function. In particular, since the third seal member 160 is made of a metal material, the third seal member 160 may reliably perform the sealing function even when high-temperature water is introduced through the fluid introduction space 200.

Meanwhile, the stop seal 130 may generate a differential pressure due to the Bernoulli action by the flow rate of the coolant flowing through the gap between the housing 110 and the pump shaft 120 even in a special situation in which a low-temperature coolant leaks into the fluid introduction space 200, and at this time, the second seal member 150 comes into contact with the pump shaft 120 to perform the initial sealing.

The stop seal of the related art may cause an abnormal situation in which a shape memory alloy part made of a metal material is in direct contact with the pump shaft to cause the vibration of the pump shaft and stop the nuclear power plant.

However, the stop seal of the present invention performs a sealing function while the second seal member made of a plastic material is in contact with the pump shaft by contracting and deforming the first seal member when only a high temperature condition occurs under a malfunction or a condition of rotating the pump shaft. However, the second seal member in contact with the pump shaft does not induce the vibration of the pump shaft, thereby not causing an abnormal situation in which the nuclear power plant needs to be stopped.

Meanwhile, when an additional fluid of high temperature and high pressure is introduced, the third seal member is contacted, and in this case, there is an advantage of achieving a tight sealing function.

The stop seal according to the present invention may also be modified as follows.

Figure 7:
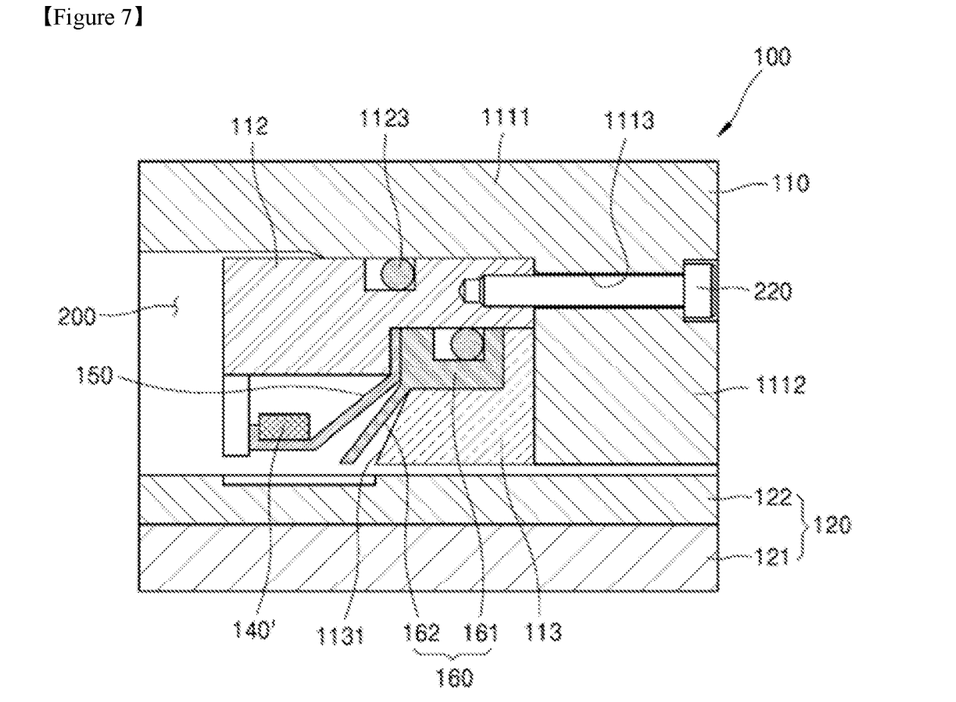
FIG. 7 is a diagram illustrating a stop seal according to another embodiment of the present invention.

In the above-described embodiment, the first seal member made of the shape memory alloy material has a circular cross section, but is not limited thereto, and a first seal member 140' can have a rectangular cross section as illustrated in FIG. 7.

Figure 8:
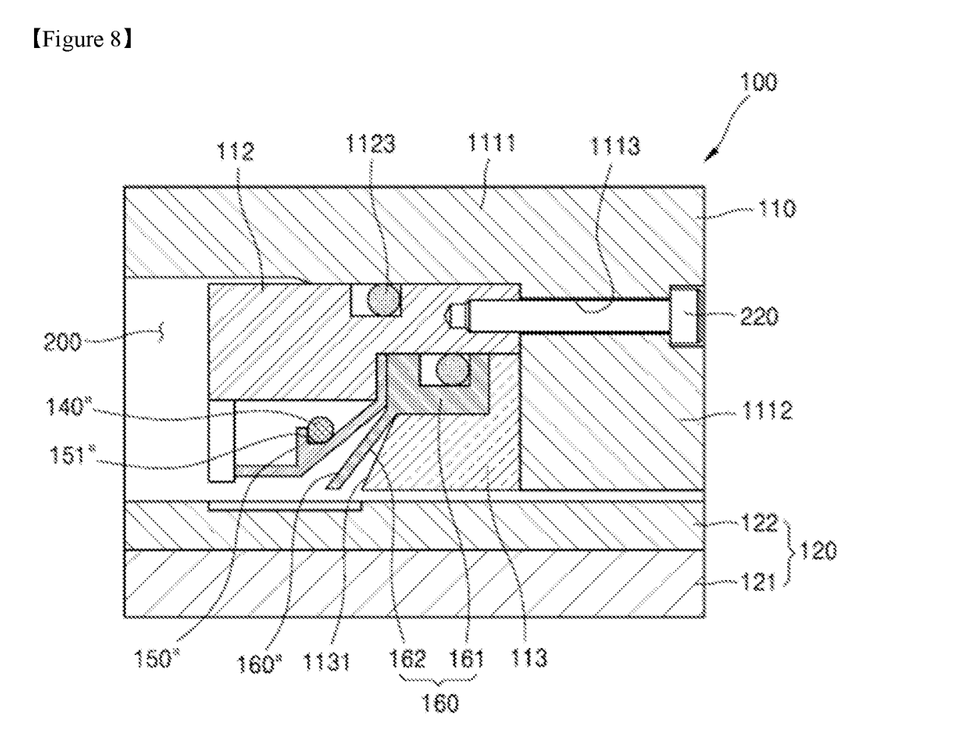
FIG. 8 is a diagram illustrating a stop seal according to yet another embodiment of the present invention.

In the above-described embodiment, it has been illustrated that the first seal member is seated on the opposite surface to the surface facing the pump shaft in the second seal member, but is not limited thereto, and as illustrated in FIG. 8, a first seal member 140" is a middle portion of a second seal member 150" and can be formed on an opposite surface to the surface facing a third seal member 160". Specifically, the first seal member 140" is configured to be seated on a recessed portion 151" provided in the middle of the second seal member 150". In this case, there is an advantage of preventing the contracting force of the first seal member 140" from being directly transmitted to the pump shaft.

While the present invention has been described in detail above with reference to preferred embodiments, the present invention is not necessarily limited to these embodiments, and various modifications may be made without departing from the technical spirit of the present invention.

The invention claimed is:
1. A stop seal for application of high temperature and high pressure, which the stop seal is adapted for installation between a column-shaped pump shaft and a housing surrounding the pump shaft and spaced apart from the pump shaft at a predetermined interval to have a gap between the pump shaft and the housing, comprising:
- a first seal member as an assembly of operating on the fluid of high temperature and high pressure, which is made of a shape memory alloy material, and is deformed when the fluid of high temperature is introduced to be moved in a direction adjacent to the pump shaft;
- a second seal member which has one side fixed to the housing and an opposite side which is movable between a first position spaced apart from the pump shaft and a second position in contact with the pump shaft to seal the gap, and is made of a synthetic resin material; and
- a third seal member made of a metal material which has one side fixed to the housing and an opposite side which is moved between a third position spaced apart from the pump shaft and a fourth position coming into contact with the pump shaft to block the gap, and is moved from the third position to the fourth position by the second seal member elastically deformed by a differential pressure to seal the gap when the differential pressure is generated before and after the second seal member after the second seal member blocks the gap,
- wherein when the fluid of high temperature and high pressure is introduced and the first seal member is moved in the direction adjacent to the pump shaft, the opposite side of the second seal member is moved from the first position to the second position by the first seal member to block the gap between the pump shaft and the housing, thereby preventing the fluid of high temperature and high pressure from leaking into the atmospheric space.

2. The stop seal for application of high temperature and high pressure of claim 1, wherein the second seal member is made of a softer material than the pump shaft.

3. The stop seal for application of high temperature and high pressure of claim 1, wherein the other end of the second seal member is disposed between the pump shaft and the first seal member and the other end of the second seal member comes into contact with the pump shaft when the first seal member is moved close to the pump shaft.

4. The stop seal for application of high temperature and high pressure of claim 3, wherein the second seal member has a first fixing part of which one end is fixed to the housing and a first extension part extending from the first fixing part toward the pump shaft,
  wherein the first seal member is in contact with an opposite surface to the surface facing the pump shaft in the first extension part.

5. The stop seal for application of high temperature and high pressure of claim 4, wherein a locking protrusion is provided on the end of the first extension part to be curved in a direction far away from the pump shaft to prevent the first seal member from being separated.

6. The stop seal for application of high temperature and high pressure of claim 1, wherein the second seal member is provided between the first seal member and the third seal member.

7. The stop seal for application of high temperature and high pressure of claim 6, wherein the third seal member has a second fixing part of which one end is fixed to the housing and a second extension part extending from the second fixing part toward the pump shaft,
  wherein an opposite surface to the surface facing the pump shaft in the second extension part faces the second seal member.

8. The stop seal for application of high temperature and high pressure of claim 1, wherein the third seal member is made of a harder material than the second seal member.

* * * * *